United States Patent
Immerman et al.

(10) Patent No.: US 11,097,973 B2
(45) Date of Patent: Aug. 24, 2021

(54) MOLD STACK FOR FORMING 3D GLASS-BASED ARTICLES

(71) Applicant: CORNING INCORPORATED, Corning, NY (US)

(72) Inventors: Jacob Immerman, Corning, NY (US); Andrew Peter Kittleson, Honeoye Falls, NY (US); Rohit Rai, Painted Post, NY (US); Ljerka Ukrainczyk, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/475,897

(22) Filed: Mar. 31, 2017

(65) Prior Publication Data
US 2017/0283295 A1 Oct. 5, 2017

Related U.S. Application Data

(60) Provisional application No. 62/318,293, filed on Apr. 5, 2016.

(51) Int. Cl.
| | | |
|---|---|---|
| *C03B 23/00* | (2006.01) | |
| *C03B 11/12* | (2006.01) | |
| *C03B 23/023* | (2006.01) | |
| *C03B 23/035* | (2006.01) | |

(52) U.S. Cl.
CPC ........ *C03B 11/125* (2013.01); *C03B 23/0093* (2013.01); *C03B 23/0235* (2013.01); *C03B 23/0357* (2013.01); *C03B 2215/03* (2013.01); *C03B 2215/06* (2013.01)

(58) Field of Classification Search
CPC ............ C03B 23/0357; C03B 23/0093; C03B 23/0235
See application file for complete search history.

(56) References Cited

U.S. PATENT DOCUMENTS

| | | | | |
|---|---|---|---|---|
| 2,137,115 A | * | 11/1938 | Marshall ............. | C03B 23/0258 65/169 |
| 2,702,411 A | * | 2/1955 | Winstead ................ | B29C 51/10 101/32 |
| 2,969,613 A | * | 1/1961 | Lambert ................. | B29C 51/10 65/273 |

(Continued)

FOREIGN PATENT DOCUMENTS

| | | |
|---|---|---|
| CN | 103732548 A | 4/2014 |
| CN | 105330136 A | 2/2016 |

(Continued)

OTHER PUBLICATIONS

Merriam-Webster Online Dictionary definition for "plenum". Downloaded Oct. 30, 2007. 2 pages (Year: 2007).*

(Continued)

*Primary Examiner* — John M Hoffmann
(74) *Attorney, Agent, or Firm* — John P. McGroarty

(57) ABSTRACT

A mold stack for forming 3D glass-based articles includes a plenum and a cooling structure integrated with the plenum. The mold stack includes a mold with a flange that can be used to mount the mold on the plenum. The mold stack includes features to reduce mold warp without significantly increasing thermal mass.

21 Claims, 12 Drawing Sheets

(56) References Cited

U.S. PATENT DOCUMENTS

| | | | | |
|---|---|---|---|---|
| 3,004,295 | A | * | 10/1961 | Bottoms ................ B29C 51/14 |
| | | | | 144/256.1 |
| 3,268,316 | A | * | 8/1966 | Snyder ................ C03B 23/245 |
| | | | | 219/200 |
| 4,737,182 | A | * | 4/1988 | Fecik ................ C03B 23/0302 |
| | | | | 65/102 |
| 5,427,599 | A | | 6/1995 | Greschner et al. |
| 8,783,066 | B2 | | 7/2014 | Bailey et al. |
| 9,505,648 | B2 | | 11/2016 | Afzal et al. |
| 9,512,027 | B2 | | 12/2016 | Sheehan et al. |
| 2014/0234581 | A1 | | 8/2014 | Immerman et al. |
| 2015/0040612 | A1 | | 2/2015 | Afzal et al. |
| 2015/0175468 | A1 | | 6/2015 | Sheehan et al. |
| 2015/0329402 | A1 | | 11/2015 | Afzal et al. |

FOREIGN PATENT DOCUMENTS

| | | |
|---|---|---|
| EP | 0838438 A1 | 4/1998 |
| EP | 2678281 A1 | 1/2014 |
| JP | 2014-166955 A | 9/2014 |
| WO | 2014/113779 A2 | 7/2014 |

OTHER PUBLICATIONS

American Heritage Dictionary definition of "plenum". Downloaded from bartleby.com on Oct. 30, 2007. 2 pages. (Year: 2007).*

International Search Report and Written Opinion PCT/US2017/026137 dated Jul. 5, 2017.

Japanese Patent Application No. 2018-551927, Office Action dated Apr. 9, 2021, 6 pages (3 pages of English Translation and 3 pages of Original Document); Japanese Patent Office.

Chinese Patent Application No. 201780022407.6, Office Action dated Apr. 26, 2021, 13 pages (5 pages of English Translation and 8 pages of Original Document), Chinese Patent Office.

Zhang et al., "Welding ability, deformation control technology and operation skills", Series of Welding Process and Operating Skills, edited by the editorial board Shenyang: Liaoning Science and Technology Press, Jan. 31, 2011, pp. 108-110.(English Translation).

* cited by examiner

MOLD STACK FOR FORMING 3D GLASS-BASED ARTICLES

CROSS-REFERENCE TO RELATED APPLICATIONS

This application claims the benefit of priority under 35 U.S.C. § 119 of U.S. Provisional Application Ser. No. 62/318,293 filed on Apr. 5, 2016 the content of which is relied upon and incorporated herein by reference in its entirety.

BACKGROUND

Consumer electronic manufacturers increasingly view 3D, or non-planar, cover glass articles as differentiating design elements that will enable them to continue to evolve their device designs and generate ongoing interest from the marketplace. To service this market, glass manufacturers and component suppliers have developed several competing processes to form 3D shapes from flat glass preforms. These solutions include double-mold processes, such as pressing, where molds contact both sides of the preform, and one-mold processes, such as vacuum forming and pressure forming, where a mold contacts only one side of the preform. Regardless of the particular solution, the flat preform conforms to the mold through application of high temperature and pressure. Thus the ability to meet the tight customer tolerances required for these articles depends on the mold maintaining its shape after thermal cycling at high temperatures.

Customers generally require very strict specifications for 3D cover glass articles, both in terms of shape and cosmetic quality. Glass forming is easier and faster at high temperatures (or low glass viscosities), whereas cosmetic quality of glass is typically better at lower temperatures. Also, mold life is expected to be longer at lower temperatures. One forming approach that balances these conflicting needs is the anisothermal hot-glass/cold-mold process ("cold mold" here refers to the mold being colder than the glass temperature while still being much hotter than the ambient temperature). This forming approach involves short cycle time and usually significant temperature gradients in the mold stack, i.e., the mold and other structures coupled to the mold to form a stack.

Significant temperature gradients in the mold stack together with different thermo-mechanical properties in the mold stack can cause mold warp during the forming process. Mold warp depletes, and sometimes consumes, the allowed shape tolerances for forming. The end result might be a finished glass article that does not fit on the device. Increasing the thickness of the mold to reduce mold warp may lead to the mold having excessive thermal mass, which would increase the heating and cooling times of the mold, and hence the cycle time.

One approach to reducing mold warp is by forming the article using a quasi-isothermal forming process, i.e., a forming process in which the mold is heated very slowly to prevent significant temperature gradients from developing. A drawback of this approach is long cycle time, and hence low productivity. Another approach to reducing mold warp is by reducing temperature gradients using a very high thermal conductivity material, such as graphite, for the mold. However, there are usually other considerations that impact and constrain mold material choice. Graphite molds, for example, require an inert environment for high temperature applications.

BRIEF SUMMARY OF THE DISCLOSURE

In a first aspect, a mold stack for forming 3D glass-based articles includes a plenum having a plenum base integrated with a plenum enclosure wall. The integrated plenum base and plenum enclosure wall define a plenum chamber. The mold stack further includes a cooling structure disposed within the plenum chamber. The cooling structure includes a cooling structure enclosure wall that is integrated with the plenum base such that a portion of the plenum base forms a cooling structure base. The cooling structure wall divides the plenum chamber into a cooling chamber within the cooling structure enclosure wall and a process chamber outside of the cooling structure enclosure wall. The cooling structure further includes a diffuser plate mounted on the cooling structure enclosure wall. The diffuser plate isolates the cooling chamber from the process chamber. The cooling structure further includes an inlet hole and an exit hole formed in the cooling structure base. The inlet hole and exit hole are in communication with the cooling chamber. The mold stack further includes a mold having a flange that is removably attached to a top surface of the plenum enclosure wall.

In a second aspect, a mold stack as described in the first aspect further includes an insulation block disposed underneath the plenum.

In a third aspect, a mold stack as described in the first or second aspect further includes a tube assembly having a first passage in communication with the cooling chamber and a second fluid passage in communication with the process chamber.

In a fourth aspect, in a mold stack as described in any of the first to the third aspects, a portion of a bottom surface of the mold is in opposing relation with a top surface of the diffuser plate when the flange is attached to the top surface of the plenum enclosure wall.

In a fifth aspect, in a mold stack as described in the fourth aspect, a gap between the portion of the bottom surface of the mold that is in opposing relation with the top surface of the diffuser plate is in a range from 0 to 25 microns.

In a sixth aspect, in a mold stack as described in the fifth aspect, the top surface of the diffuser plate is level with the top surface of the plenum enclosure wall.

In a seventh aspect, in a mold stack as described in any of the first to the sixth aspects, a bottom surface of the mold is contoured to apply a preload to the mold.

In an eighth aspect, in a mold stack as described in any of the first to the seventh aspects, mounting holes are formed in each of the plenum enclosure wall and the flange, and a pattern of the mounting holes in the plenum enclosure wall matches a pattern of the mounting holes in the flange such that the mounting holes in the plenum enclosure wall can be aligned with the mounting holes in the flange.

In a ninth aspect, in a mold stack as described in the eighth aspect, the pattern of the mounting holes is selected to provide a sealed interface between the flange and the plenum enclosure wall when fasteners are received in the mounting hole and made up.

In a tenth aspect, in a mold stack as described in the eighth aspect, the mounting holes are adapted to receive fasteners to removably attach the flange to the plenum enclosure wall.

In an eleventh aspect, in a mold stack as described in the tenth aspect, at least a portion of the mounting holes are adapted to receive fasteners from a top surface of the flange.

In a twelfth aspect, in a mold stack as described in the tenth aspect, the mounting holes are adapted to receive fasteners from a bottom surface of the plenum, and a top surface of the plenum enclosure wall is flat.

In a thirteenth aspect, in a mold stack as described in the eighth aspect, the mold is made of a nickel alloy and the flange is attached to the top surface of the plenum enclosure wall by means of at least one strip of bolts having a strip made of an alloy having a higher strength than the nickel alloy.

In a fourteenth aspect, a mold stack as described in any of the first to the thirteenth aspects further includes a tube attached to the cooling structure base. At least two first orifices are formed in a surface of the tube exposed to the cooling chamber and at least one second orifice is formed in a surface of the tube in contact with the cooling structure base. The at least two first orifices are in communication with the cooling chamber and the at least one second orifice is in communication with the exit hole.

In a fifteenth aspect, in a mold stack as described in the fourteenth aspect, the inlet hole is located at the center of the cooling structure base and the at least two first orifices are located near opposite edges of the cooling structure base.

In a sixteenth aspect, in a mold as described in the fifteenth aspect, the at least two orifices are symmetrical about the inlet hole.

In a seventeenth aspect, in a mold stack as described in any of the first to the sixteenth aspects, the mold has at least one vacuum hole, and the at least one vacuum hole communicates with the process chamber.

In an eighteenth aspect, in a mold stack as described in any one of the first to the seventeenth aspects, the plenum enclosure wall has a uniform wall thickness, the plenum base has a uniform base thickness, a ratio of the wall thickness to the base thickness is in a range from 0.8 to 1.2, and a ratio of the base thickness to a wall height of the plenum enclosure wall is in a range from 0.6 to 1.0.

In a nineteenth aspect, in a mold stack as described in any one of the first to the eighteenth aspects, a ratio of the plenum base thickness to a thickness of the mold center is in a range from 0.8 to 1.2, and a ratio of the plenum enclosure wall thickness to the mold center thickness may be in a range from 0.8 to 1.2.

In a twentieth aspect, in a mold stack as described in any one of the first to the eighteenth aspects, the diffuser plate is made of a high thermal conductivity material with a minimum plate thickness of 3 mm.

In a twenty-first aspect, in a mold stack as described in the twentieth aspect, the high thermal conductivity material is a nickel alloy.

The foregoing general description and the following detailed description are exemplary of the invention and are intended to provide an overview or framework for understanding the nature of the invention as it is claimed. The accompanying drawings are included to provide further understanding of the invention and are incorporated in and constitute a part of this specification. The drawings illustrate various embodiments of the invention and together with the description serve to explain the principles and operation of the invention.

BRIEF DESCRIPTION OF THE DRAWINGS

The following is a description of the figures in the accompanying drawings. The figures are not necessarily to scale, and certain figures and certain views of the figures may be shown exaggerated in scale or in schematic in the interest of clarity and conciseness.

DETAILED DESCRIPTION OF EMBODIMENT(S)

In the following detailed description, numerous specific details may be set forth in order to provide a thorough understanding of embodiments of the invention. However, it will be clear to one skilled in the art when embodiments of the invention may be practiced without some or all of these specific details. In other instances, well-known features or processes may not be described in detail so as not to unnecessarily obscure the invention. In addition, like or identical reference numbers may be used to identify common or similar elements.

Figure 1:
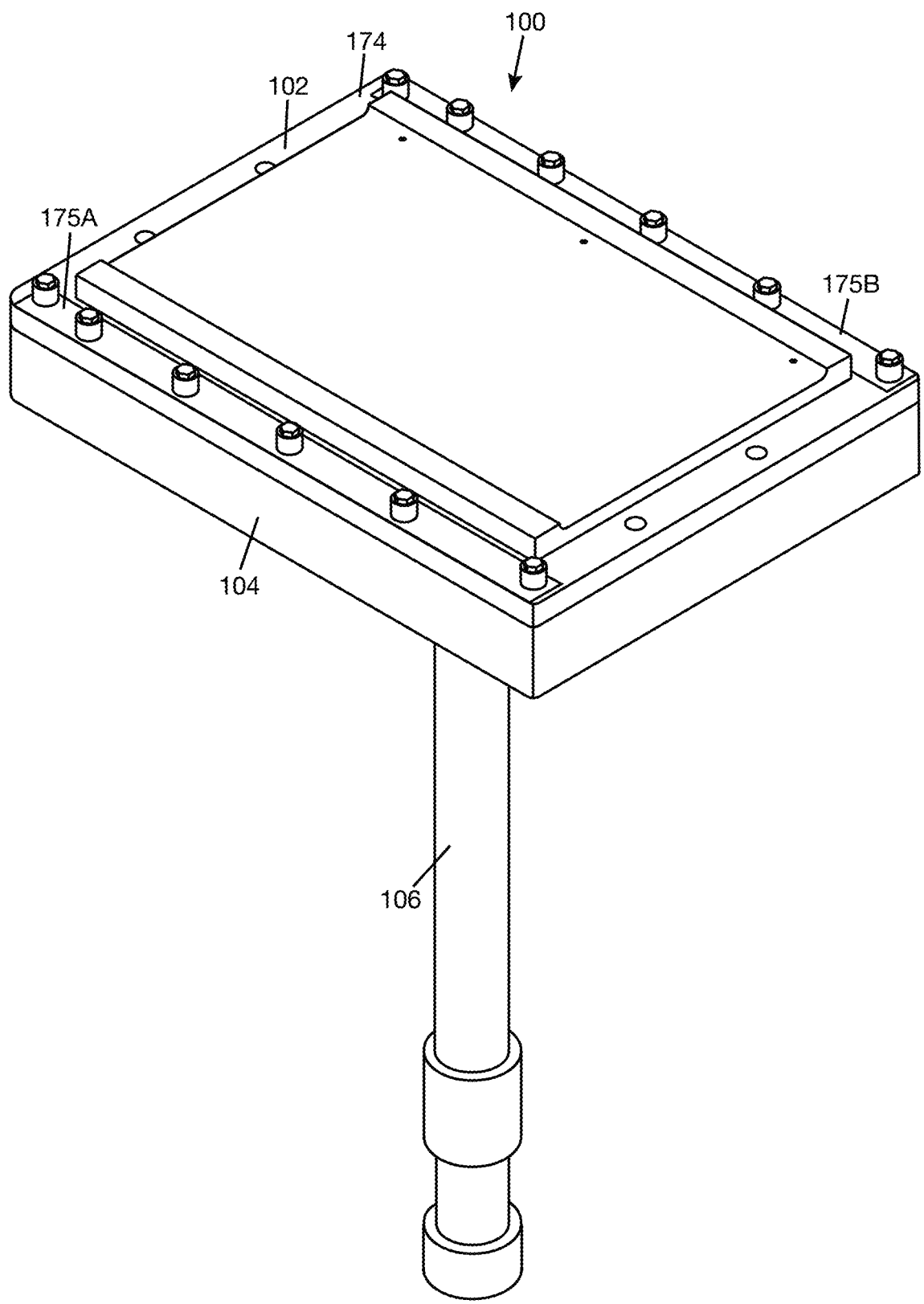
FIG. 1 shows a mold stack according to one embodiment.

FIG. 1 shows a mold stack 100, according to one embodiment. The mold stack 100 may be used in a glass molding system for forming 3D glass-based articles. As used herein, glass-based materials or glass-based articles include both glass and glass-ceramic materials/articles. An example of a glass molding system in which the mold stack 100 may be used is disclosed in U.S. Pat. No. 8,783,066 (Bailey et al.). The mold stack 100 may replace the mold stack disclosed in the Bailey et al. patent. In FIG. 1, the mold stack 100 includes a mold 102 mounted on a plenum 104 with an integrated cooling structure. The mold 102 is clamped to the plenum 104 using suitable fastening means, preferably one that enables a reliable seal at the interface between the mold 102 and the plenum 104. Extending below the plenum 104 is a tube assembly 106, which provides passages that may be used for supplying vacuum to the plenum 104 and supplying cooling fluid to the cooling structure integrated with the plenum 104.

In one embodiment, the plenum 104 is made in one-piece, i.e., without a separate removable base plate as in the mold stack of the Bailey et al. patent. The one-piece plenum 104 together with the integrated cooling structure will reduce one source of mold-to-mold variation in forming processes. With a multi-piece plenum, there are more mating surfaces (e.g., plenum walls/plenum base, cooling can/plenum base), and all these must be matched, or else the bolted structure may have stress, warp, and/or gap. For example, it is relatively easy for the one-piece plenum with the integrated cooling structure to have the top of the cooling structure at the same level as the top of the plenum walls, by grinding the top face of the integrated structure. On the other hand, when the plenum and cooling can are separate components, the deviations in dimensions (within tolerance) of each component can add up so that for the assembled structure the top surface of the plenum and the cooling can may not be level within tolerance limits. This will contribute to the variation in gap between the top surface of cooling can and the bottom surface of the mold.

Figure 2:
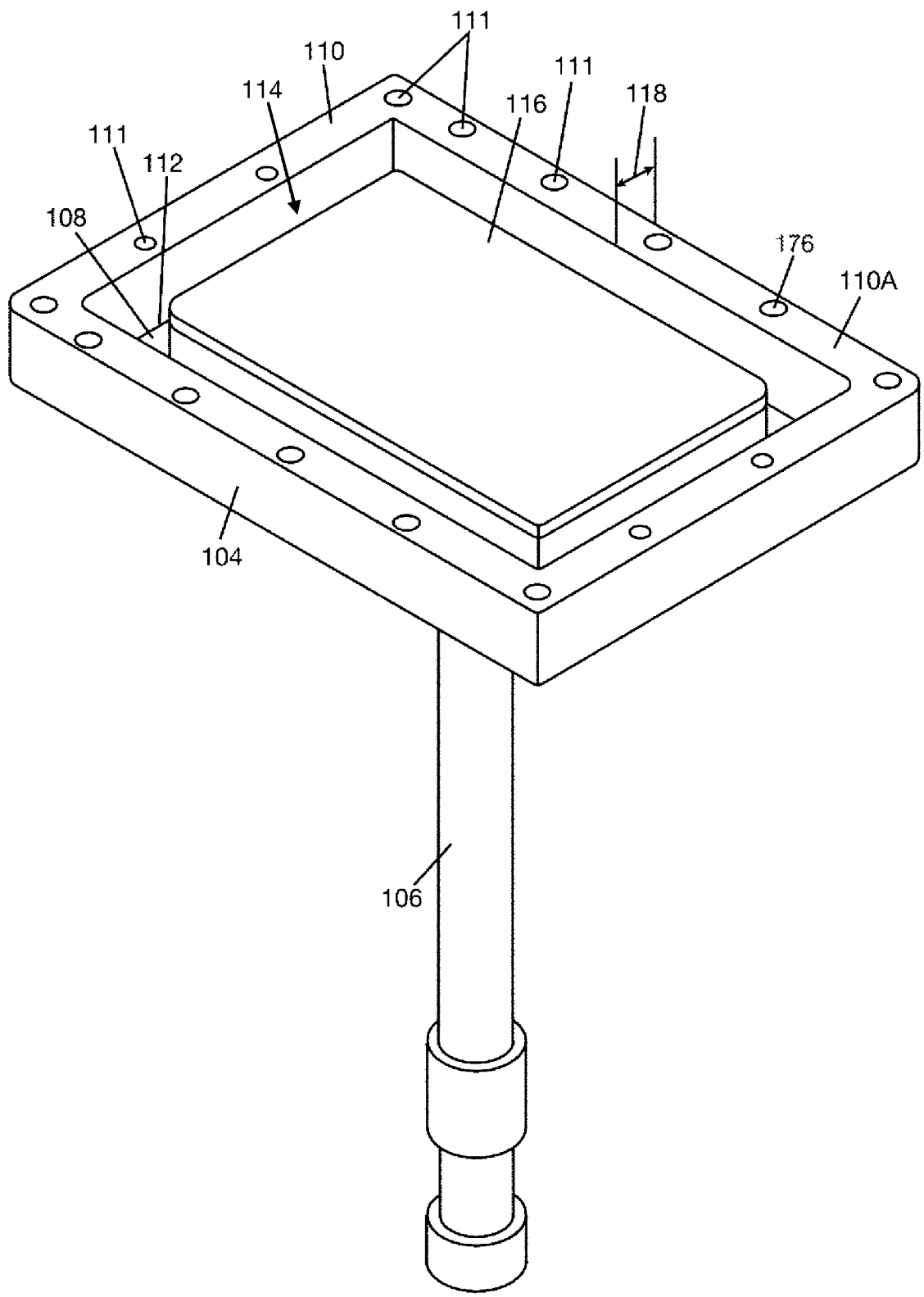
FIG. 2 shows the mold stack of FIG. 1 with the mold omitted for clarity purposes.

FIG. 2 shows the mold stack (100 in FIG. 1) with the mold (102 in FIG. 1) omitted to allow viewing of the inside of the plenum 104. In FIG. 2A, the plenum 104 is shown as having a plenum base 108 and a plenum enclosure wall 110. The plenum enclosure wall 110 may have any suitable shape. In one example, the plenum enclosure wall 110 is made of four vertical walls, which are joined together at the corners to form an enclosure. The plenum enclosure wall 110 is joined to the plenum base 108, as illustrated at 112, to form a plenum chamber 114. In one embodiment, the plenum enclosure wall 110 is permanently joined to the plenum base 108 to form a one-piece plenum. Any suitable means of joining the plenum enclosure wall 110 to the plenum base 108, such as welding and the like or forming the plenum base 108 and plenum enclosure wall 110 as an integral body, may be used. Preferably, any interface between the plenum base 108 and plenum enclosure wall 110 is sealed or airtight.

In one embodiment, the plenum 104 is made of a high-strength, high-temperature material, for example, a high-strength, high-temperature material with a tensile strength greater than 400 MPa at 650° C. One example of a suitable material for the plenum 104 is Inconel 625. Other alloys from the Inconel family or from the Hastelloy family may also be used. In one embodiment, the plenum enclosure wall 110 has a uniform wall thickness. Preferably, the wall thickness of the plenum enclosure wall 110 is selected to provide sufficient rigidity to the plenum 104. However, very thick walls should generally be avoided so that the thermal mass of the plenum 104, and hence the cycle time, is kept low. In one example, the wall thickness 118 of the plenum enclosure wall 110 may be in a range from 10 mm to 14 mm. In one embodiment, the plenum base 108 also has a uniform thickness, which may be selected to enhance the overall rigidity of the plenum 104 and thereby reduce mold warp. In one example, the base thickness (120 in FIG. 4B) of the plenum base 108 may be in a range from 10.5 mm to 14.5 mm.

In one embodiment, for a good balance between rigidity and low thermal mass, the ratio of wall thickness to base thickness of the plenum 104 may be in a range from 0.8 to 1.2, the ratio of base thickness to wall height of the plenum 104 may be in a range from 0.6 to 1.0. Also, for a good balance between rigidity and low thermal mass, the plenum base thickness to mold center thickness (i.e., thickness at the center of the mold) may be in a range from 0.8 to 1.2, and the plenum enclosure wall thickness to mold center thickness may be in a range from 0.8 to 1.2. Table 1 below shows an example of dimensions for the plenum 104. The size of parts that can be made with the plenum having the dimensions shown in Table 1 will be limited to 168 mm by 124.5 mm.

TABLE 1

| | |
|---|---|
| Overall plenum length | 168 mm |
| Overall plenum width | 124.5 mm |
| Overall plenum height | 28.4 mm |
| Plenum wall thickness | 12 mm |
| Plenum base thickness | 12.5 mm |
| Plenum wall height (Overall plenum height – plenum base thickness) | 15.9 mm |
| Plenum inside width (Overall plenum width – 2 × plenum wall thickness) | 100.5 mm |
| Plenum inside length (Overall plenum length – 2 × plenum wall thickness | 144 mm |
| Mold center thickness | 13 mm |

Figure 3:
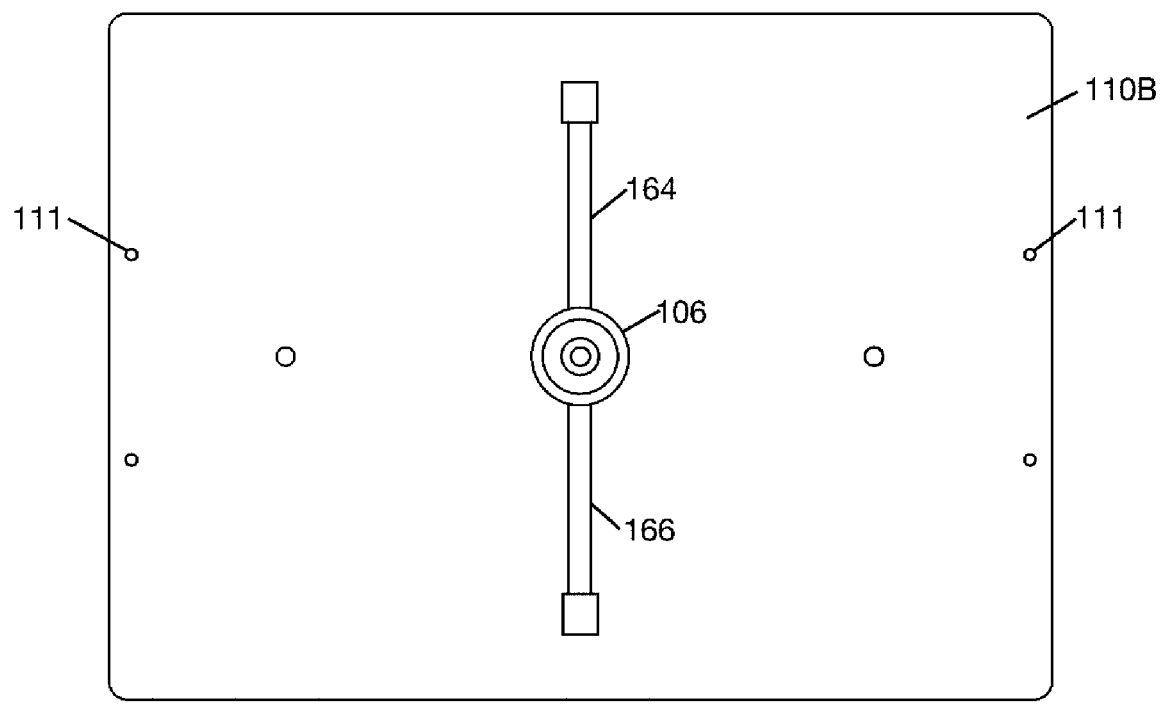
FIG. 3 shows a bottom view of the mold stack of FIG. 1.

The top end 110A of the plenum enclosure wall 110, which is also the top end of the plenum 104, is flat and forms a mounting surface for the mold (102 in FIG. 1). Holes 111 (not all the holes 111 are labeled in FIG. 2 for clarity) may be formed in the plenum enclosure wall 110 with openings at the top end 110A to allow insertion of fasteners from the top end 110A of the plenum 104. Some or all of the holes 111 may be through-holes extending from the top end 110A to the bottom end (110B in FIGS. 3 and 4B) of the plenum 104. Holes 111 that have openings at the bottom end of the plenum 104, such as shown, for example, in FIG. 3, may allow insertion of fasteners, to clamp the mold (102 in FIG. 1) to the plenum 104, from the bottom end 110B of the plenum 104.

Figure 4A:
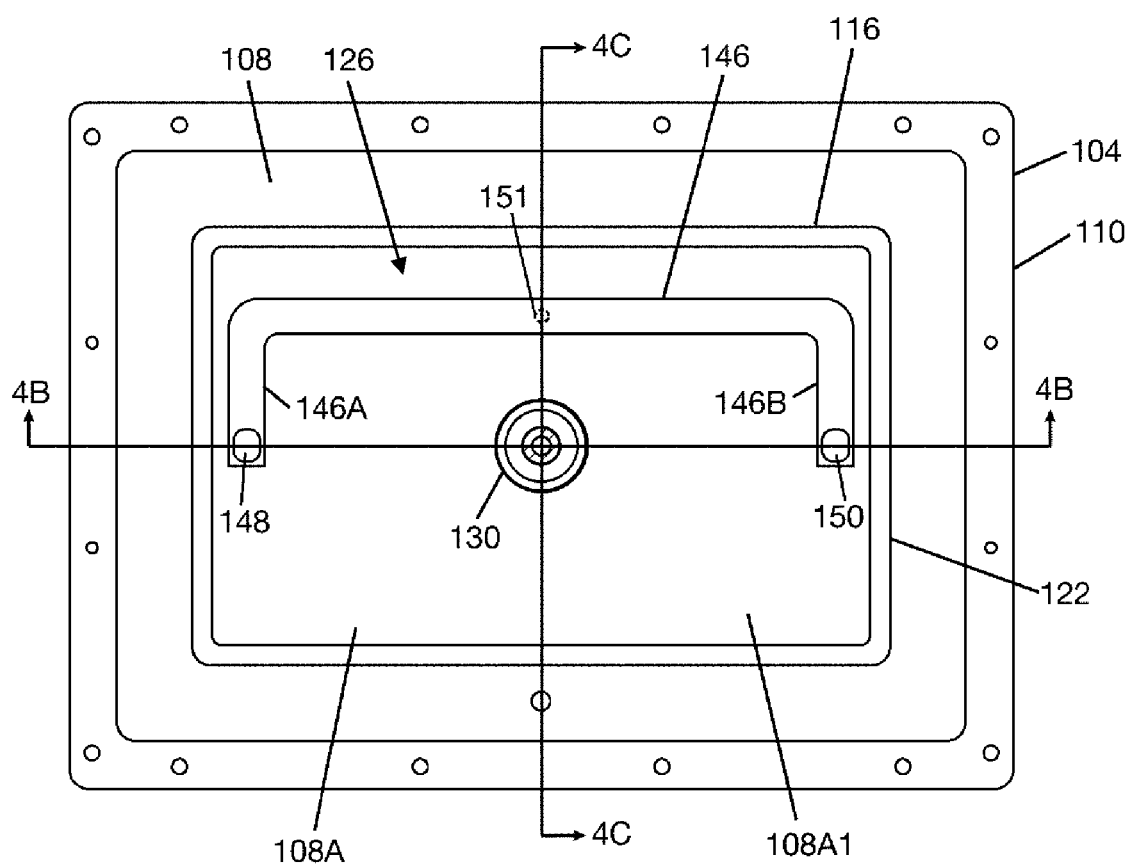
FIG. 4A shows a top view of the plenum with the integrated cooling structure of FIG. 2 with the diffuser plate of the cooling structure omitted for clarity purposes.
Figure 4B:
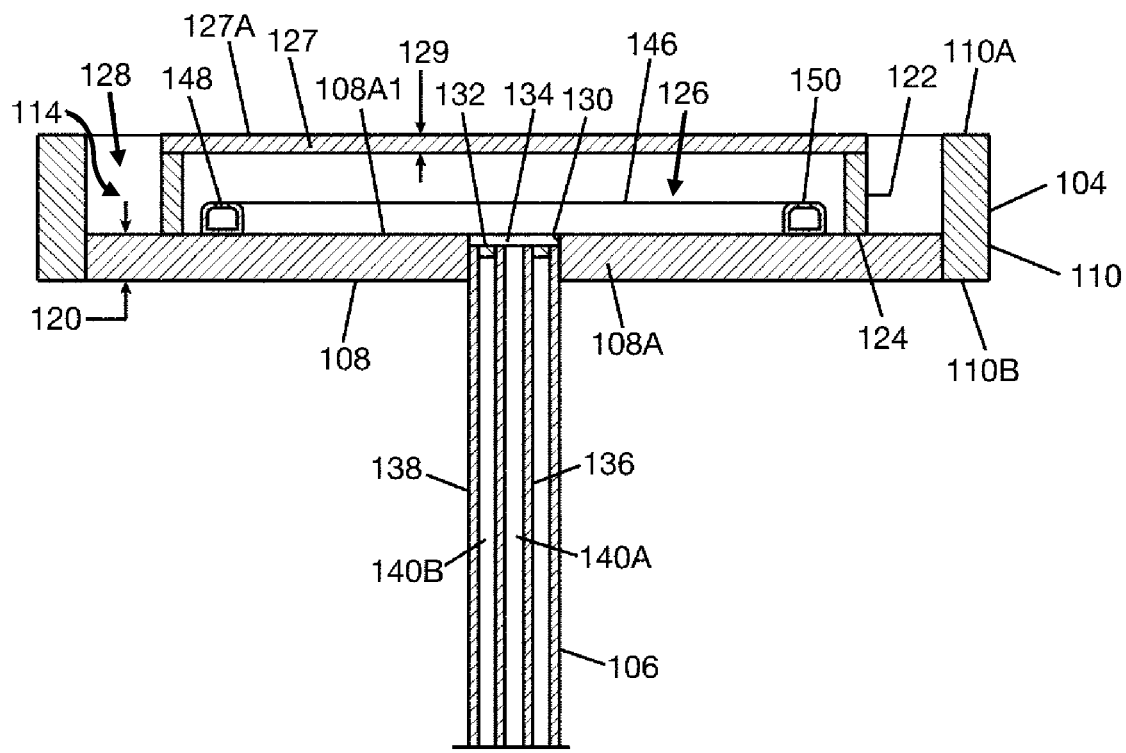
FIG. 4B shows a cross-section of FIG. 4A along lines 4B-4B.

FIG. 4B shows a cross-section of the plenum 104 and cooling structure 116. In FIG. 4B, the cooling structure 116 includes a cooling structure enclosure wall 122. In one embodiment, the cooling structure enclosure wall 122 is made of the same material as the plenum 104. A bottom end of the cooling structure enclosure wall 122 is joined to the plenum base 108, as shown at 124, to form a cooling chamber 126 within the plenum chamber 114. In one embodiment, the cooling structure enclosure wall 122 is permanently joined to the plenum base 108, thereby integrating the cooling structure 116 with the plenum 104. Any suitable method may be used to join the cooling structure enclosure wall 122 to the plenum base 108, such as welding and the like or forming the cooling structure enclosure wall 122 and plenum base 108 as an integral body. Preferably, the interface 124 between the plenum base 108 and cooling structure enclosure wall 122 is sealed or airtight.

The cooling structure enclosure wall 122 divides the plenum chamber 114 into a cooling chamber 126, i.e., the chamber within the cooling structure enclosure wall 122, and a process chamber 128, i.e., the chamber outside of the cooling structure enclosure wall 122. The process chamber 128 can be used for applying vacuum to the mold (102 in FIG. 1). A diffuser plate 127 attached to the top end of the cooling structure enclosure wall 122 isolates the cooling chamber 126 from the process chamber 128. Preferably, the interface between the diffuser plate 127 and the cooling structure enclosure wall 122 is sealed or airtight to prevent leakage of cooling fluid from the cooling chamber 126 into the process chamber 128. The diffuser plate 127 may be permanently attached to the cooling structure enclosure wall 122, such as by welding and the like, or may be removably attached to the cooling structure wall 122, e.g., to allow access to the cooling chamber 126 at a later time for maintenance.

In one embodiment, the diffuser plate 127 is made of a high thermal conductivity material that can function at operating temperatures that may be used in forming the glass-based article. The term "high thermal conductivity material" is relative to the plenum/mold materials. If the mold and plenum materials are Inconel series alloys, for example, then a suitable material may be Nickel Alloy Ni-201. Ni-201 has a thermal conductivity, k, of 58-65 W/m-K in the operating range of 500° C. to 800° C. In one embodiment, the diffuser plate 127 with the high thermal conductivity will function as a heat diffuser that allows heat extraction from the mold to be spread over a large area. Therefore, the diffuser plate 127 with the high thermal conductivity should have a minimum thickness to be effective as a heat diffuser. For embodiments where the diffuser plate 127 is made of, for example, a nickel alloy such as Nickel Alloy Ni-201 or other similar high thermal conductivity material, the diffuser plate 127 may have a thickness 129 of at least 3 mm. There is no cut-off thermal conductivity for the diffuser plate. If a lower thermal conductivity material is used, e.g., a material having half the thermal conductivity of Ni-201, the diffuser plate will need to be thicker, e.g., twice as thick as the Ni-201 plate.

In one embodiment, the top surface 127A of the diffuser plate 127 is level with the top end 110A of the plenum enclosure wall 110, which would allow both the top surface 127A and top end 110A to be simultaneously ground flat to a good flatness, e.g., flatness better than 25 microns, and often better than 10 microns. Flatness can be measured using any surface measurement tool, such as FlatMaster, ATOS or OGP. Flatness may be defined as the difference in elevation between the highest and the lower point, when measured with reference to a horizontal plane. In addition to cheaper and faster fabrication, the good flatness allows controlled contact or gap between the cooling structure 116 and the bottom of the mold (see 102 in FIG. 1), thus producing consistent heat exchange between the two.

The portion 108A of the plenum base 108 having a surface 108A1 exposed to the cooling chamber 126 may be referred to as the cooling structure base. In one embodiment, an inlet hole 130 is formed in the cooling structure base 108A. The inlet hole 130 functions as an inlet through which cooling fluid can be supplied into the cooling chamber 26. The cooling fluid may be, for example, air, nitrogen, and the like. The tube assembly 106 is used for supply of the cooling fluid into the cooling chamber 126. In one embodiment, an end 132 of the tube assembly 106 is inserted into the inlet hole 130. The end 132 may be recessed relative to the surface 108A1 of the cooling structure base 108A to form an inlet chamber 134 within the inlet hole 130 that is in communication with the cooling chamber 126. In one embodiment, the tube assembly 106 includes concentric tubes 136, 138 forming concentric fluid passages 140A, 140B. The fluid passage 140A formed within the inner tube 136 opens into the inlet chamber 134. Thus the fluid passage 140A can be used to deliver cooling fluid to the cooling chamber 126.

Figure 4C:
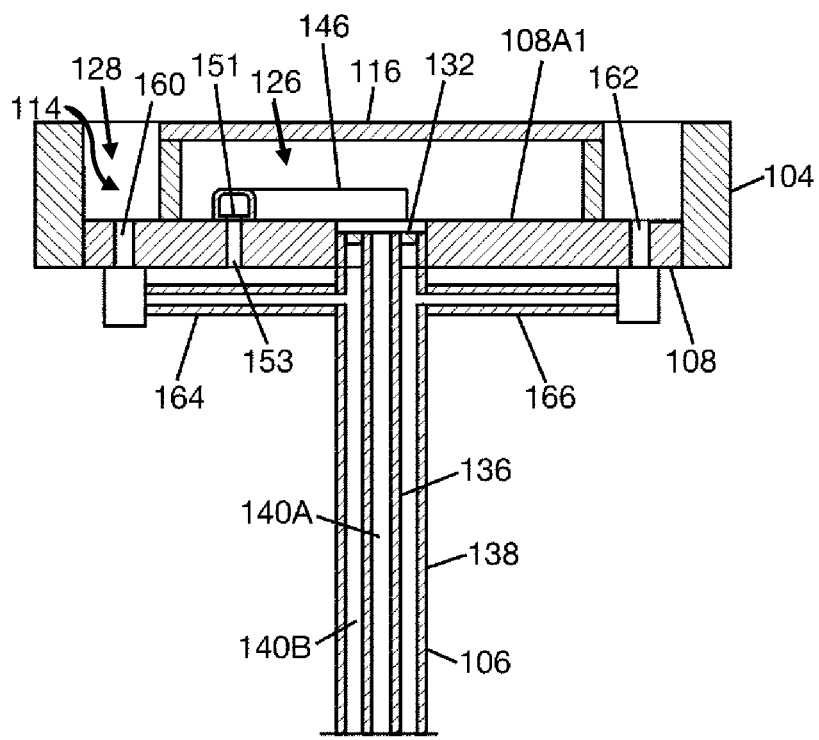
FIG. 4C shows a cross-section of FIG. 4A along lines 4C-4C.
Figure 4D:
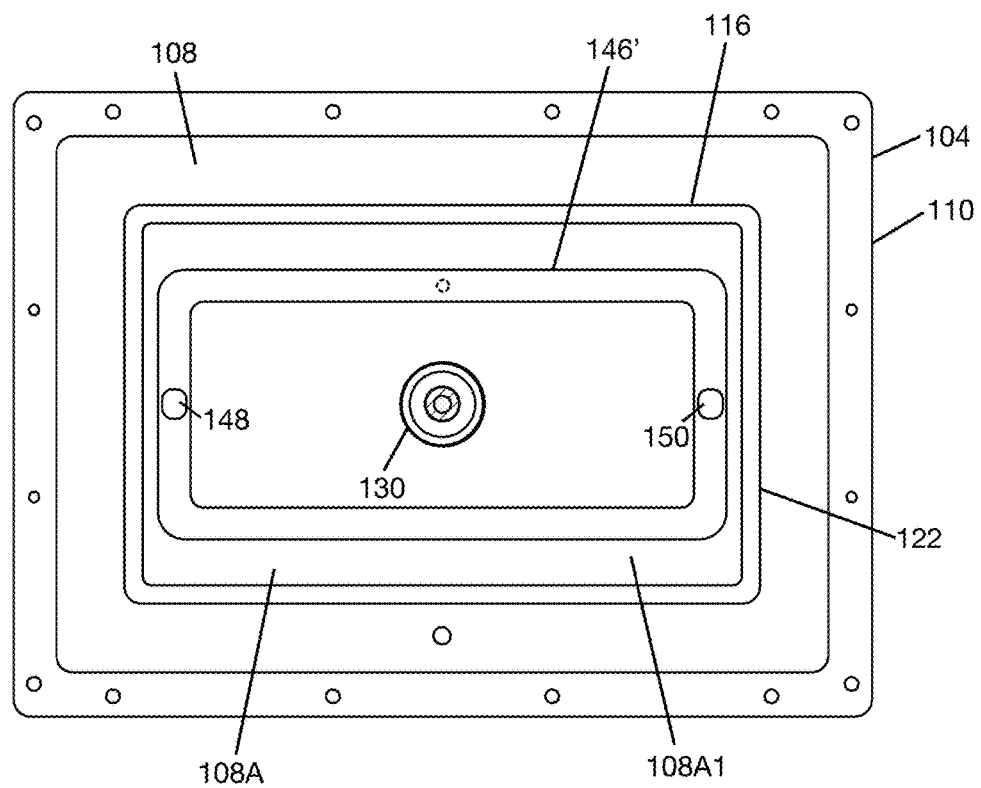
FIG. 4D shows FIG. 4A with a ring-shaped tube on the cooling structure base.

In one embodiment, a tube 146 (FIGS. 4A-4C) is fixed to the surface 108A1 of the cooling structure base 108A such that the top of the tube 146 is exposed to the cooling chamber and the bottom of the tube 146 is in contact with the surface 108A1. The tube 146 may be made of the same material as the plenum 104 and fixed to the surface 108A1 by any suitable method, such as by welding. Orifices 148, 150 are formed in the top of opposed sections (146A, 146B in FIG. 4A) of the tube 146. The orifices 148, 150 connect the cooling chamber 126 to the inside of the tube 146, allowing cooling fluid to flow from the cooling chamber 126 into the tube 146. An orifice 151 (FIGS. 4A and 4C) is formed in the bottom of the tube 146. The orifice 151 is in communication with an exit hole 153 in the cooling structure base 108A. Exit holes 153 are in communication with conduits 152 and 154, which allow fluid to transfer in and out of tube 146 (FIG. 5C). Although only one orifice 151 is shown in the bottom of the tube 146, it is possible to have more than one orifice 151. The tube 146 is shown as having a U-shape in FIG. 4A. However, the tube 146 is not limited to this shape. The tube 146 could be ring-shaped, for example, as shown at 146' in FIG. 4D. The tube 146 is used for placement of the orifices 148, 150 relative to the inlet hole 130 of the cooling structure 116 and may have any suitable shape to achieve the desired placement. Further, more than two orifices may be formed on top of the tube 146.

In one embodiment, as shown in FIG. 4A, the inlet hole 130 of the cooling structure 116 is located at the center of the cooling structure base 108A (or at the center of the cooling chamber 126), and the orifices 148, 150 of the tube 146 are located near opposite edges of the cooling structure base 108A (or near opposite edges of the cooling chamber 126). In one embodiment, the shape and placement of the tube 146 on the cooling structure base 108A is such that the orifices 148, 150 are symmetrical about the inlet hole 130. ("Symmetrical" here means that the orifices 148, 150 are equidistant from the inlet hole 130.) With this arrangement, the cooling fluid will come into the cooling chamber 126 through the inlet hole 130 and then spread freely to the edges of the cooling chamber 126, where the orifices 148, 150 are located, without the constraint of cooling channels as in the cooling plate of U.S. Pat. No. 8,783,066 (Bailey et al.). In one embodiment, the cooling structure 116 with the symmetrical outlet orifices and one inlet allows higher flows compared to the cooling channels in the cooling plate of the Bailey et al. patent. These higher flows combined with the high heat extraction of the diffuser plate 127 will enable development of the center-to-edge temperature gradients needed for forming a 3D article with an accurate shape and good cosmetics. The center-to-edge temperature gradient will allow the mold to be colder at the center, where good cosmetics in the article is desired, and warmer at the edges, where bends in the article are formed.

Returning to FIG. 4B, the flow passage 140B defined between the tubes 136, 138 is closed at the end 132 of the tube assembly 106 that is inserted into the through-hole 150 in the cooling structure base 108A. This means that the flow passage 140B is not used to deliver cooling fluid into the cooling chamber 126. In FIG. 4C, the flow passage 140B is connected to through-holes 160, 162 in the plenum base 108 by conduits 164, 166, respectively. The through-holes 160, 162 in the plenum base 108 are in communication with the process chamber 128, i.e., the portion of the plenum chamber 114 outside of the cooling structure 116. When the mold (102 in FIG. 1) is mounted on the plenum 104 as shown in FIG. 1, vacuum can be supplied to the mold through the flow passage 140B and process chamber 128.

Figure 5A:
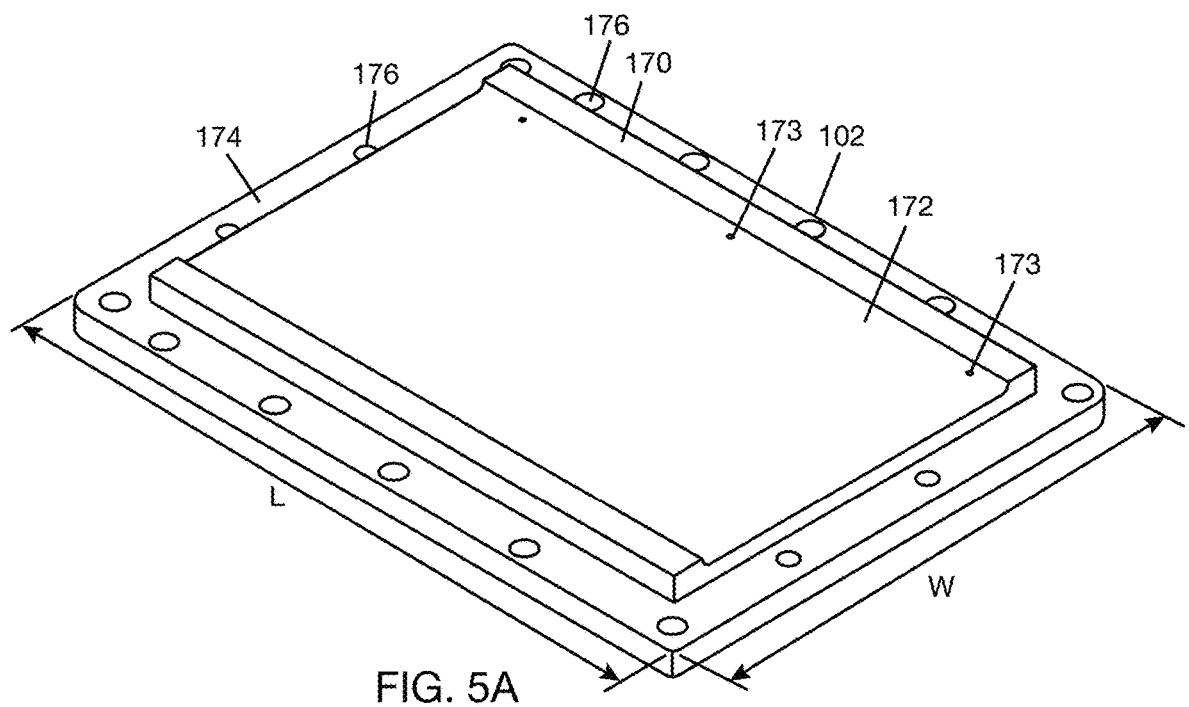
FIG. 5A shows a mold that may be used in the mold stack of FIG. 1 according to one embodiment.

FIG. 5A shows the mold 102, according to one embodiment. The mold 102 includes a mold forming portion 170 having a mold surface 172 with a select shape dictated by the 3D article to be formed. In the example shown in FIG. 5A, the mold surface 172 forms an article having a sled shape, i.e., a shape with a flat central region and two opposite edge regions that are bent Other shapes, such as dish shape (a shape with a flat central region surrounded by an edge region, where the entire edge region is bent), are possible, and the mold 102 is not limited to forming any particular shape. Vacuum holes may be formed at suitable locations to allow forming of the article by vacuum. Examples of vacuum holes 173 are shown on the mold surface 172. These vacuum holes 173 would communicate with the process chamber (128 in FIGS. 4B and 4C) when the mold 102 is mounted on the plenum (104 in FIG. 1).

Figure 5B:
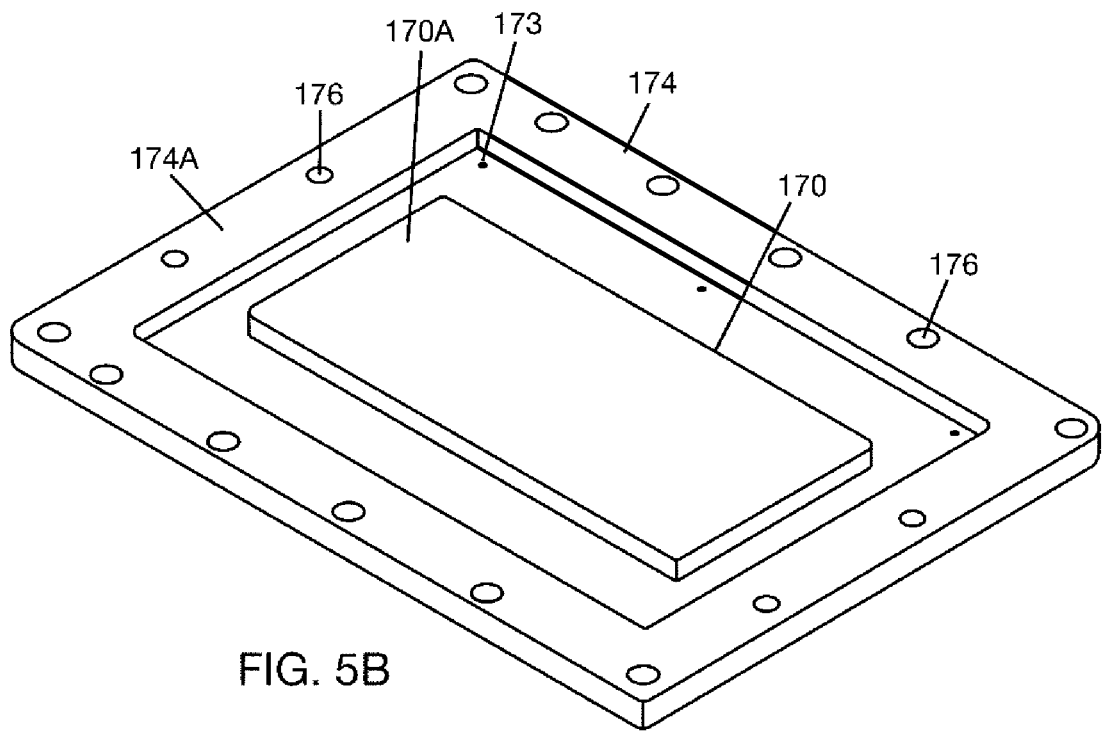
FIG. 5B shows the underside of the mold of FIG. 5A.
Figure 5C:
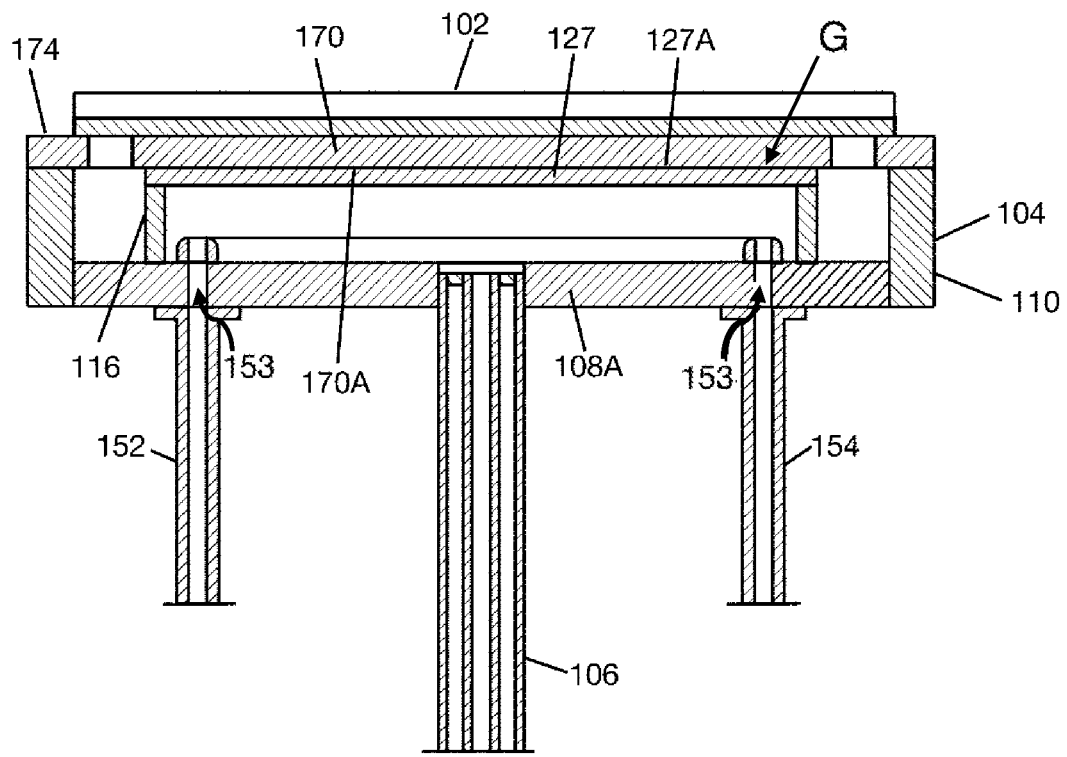
FIG. 5C shows a cross-section of the mold stack of FIG. 1.

The mold 102 includes a flange 174 formed around a perimeter of the mold forming portion 170. FIG. 5B shows an underside of the mold 102. In one embodiment, the bottom surface 174A of the flange 174 is level with the bottom surface 170A of the mold forming portion 170. This allows consistent flatness of the bottom of the mold 102. When the mold 102 is mounted on the plenum 104, as shown in FIG. 5C, the bottom surface 170A of the mold forming portion 170 will be in opposing relation to the top surface 127A of the diffuser plate 127. The flatness of the opposing surfaces 170A, 127A will help in achieving a consistent heat exchange between the mold 102 and the cooling structure 116. There should be no interference between the mold 102 and the cooling structure 116. A gap G in a range from 0 to 25 microns, preferably less than 10 microns, may be allowed at the interface between the opposing surfaces 170A, 127A.

Referring to FIGS. 5A and 5B, mold mounting holes 176 (not all the mold mounting holes 176 are labeled in FIGS. 5A and 5B for clarity) are formed in the flange 174 for receiving suitable fasteners, such as bolts or screws. The pattern (spacing, number, and placement) of the mold mounting holes 176 may be selected to match that of the plenum mounting holes (111 in FIG. 2) such that when the mold 102 is mounted on the plenum, as shown in FIG. 1, the mold mounting holes 176 are aligned with the plenum mounting holes (111 in FIG. 2). Preferably, the pattern of the plenum and mold mounting holes 176, 111 is optimized to minimize leakage from the interface formed between the mold 102 and the plenum when the mold 102 is clamped to the plenum, as shown in FIG. 1. In one example, the spacing for mounting holes 176 on each long side of the flange 174, starting from one corner to the other corner on the long side, is L/8, L/4, L/4, L/4, L/8, where L is the corner-to-corner distance. In one example, the spacing for mounting holes 176 on each short edge of the flange 174 is uniform, e.g., W/3 for the pattern shown in FIG. 5A.

For vacuum forming, fasteners, such as bolts or screws, can be inserted from the top of the flange 174, as shown in FIG. 1. The method of fastening the mold 102 to the plenum 104 may be selected based on the material of the mold 102. In one example, the mold 102 is made of Nickel Alloy, such as Ni-201 nickel alloy. In this case, strips with bolts can be used to clamp the mold 102 to the plenum 104, thereby avoiding screws that can pull on nickel. The strips may be used on only two sides, e.g., the long sides, of the flange 174 (as illustrated at 175A, 175B in FIG. 1) or on all four sides of the flange 174. The strips may be made of high strength alloy such as Inconel 600. The strips will ensure a reliable, leak-resistant, bolting over longer periods, especially when the mold is made of a weaker material than the bolts or the plenum. If threaded screws are used to fasten Ni-201 mold with the plenum, the stress at these threads in Ni-201 can exceed the yield strength of Ni-201, causing local yielding. The result will be that mold to plenum fastening will be loosened, often causing leaks. Strips of higher strength materials help apply larger bolting force without damaging the mold by distributing the load. Separate pieces (such as in washer form), instead of one-piece strip, could work as well, but strips may be more effective and convenient. In another example, the mold 102 is made of a high strength material such as Inconel. In this case, stainless steel screws with a lower modulus than Inconel can provide a reliable seal between the mold 102 and plenum 104.

Figure 6:
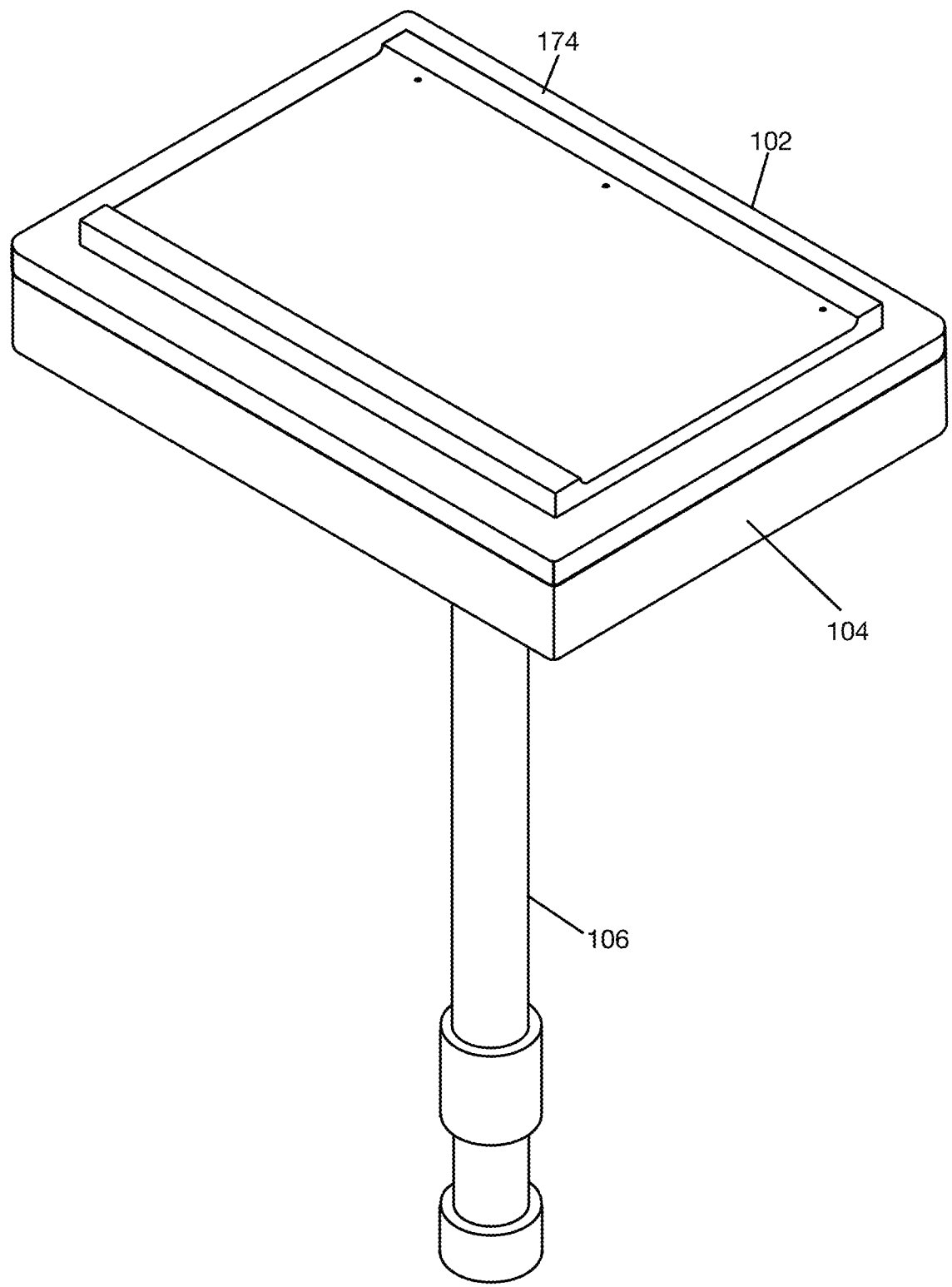
FIG. 6 shows a mold stack without fasteners on the top surface of the mold flange according to one embodiment.

For pressure forming, fasteners can be inserted from the bottom of the plenum 104 without strips. The top surface of the flange 174 will therefore be flat and free of bolts or screws, as shown in FIG. 6. A "pressure cap" (not shown) can sit on the flat top surface of the flange 174 and form a leak-resistant chamber for building forming pressure.

Figure 7A:
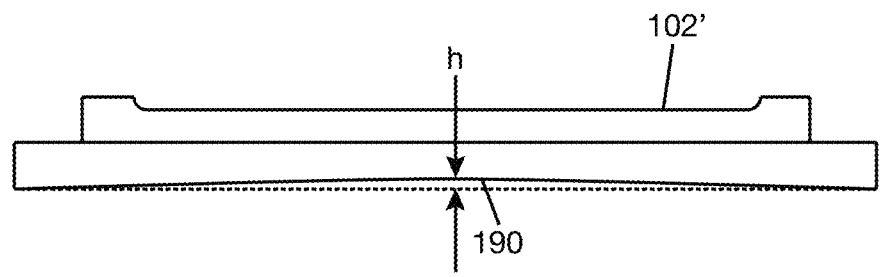
FIG. 7A shows a preloaded mold having a contoured bottom.
Figure 7B:
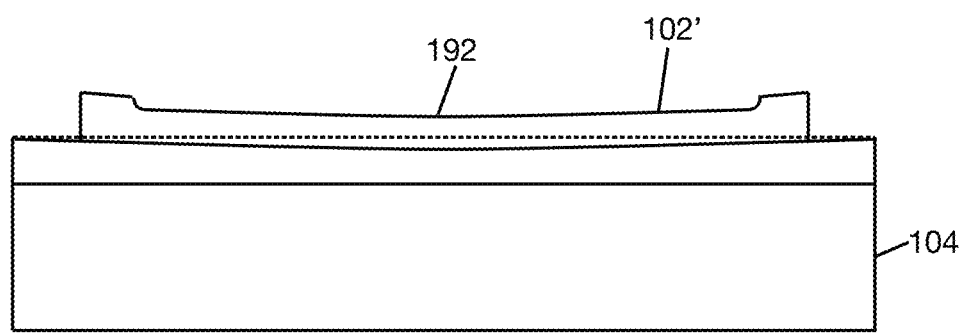
FIG. 7B shows the preloaded mold when mounted on a flat plenum.

In one embodiment, the mold 102 may be preloaded to reduce mold warp during forming. In one embodiment, preloading of the mold 102 is done by contouring the bottom surface of the mold by 50 to 150 microns. The contouring may be applied in the long axis direction only, or in both the long and short axes directions. "Contouring the long axis direction only" can be described by cutting the bottom surface of the mold with a large cylinder such that the bottom center of the mold (before attaching the mold to the plenum) is 50 to 150 microns higher than the bottom corners of the mold. "Contouring both the short and long axes directions" can be described by cutting the bottom surface of the mold with a large sphere such that the bottom center of the mold (before attaching the mold to the plenum) is 50 to 150 microns higher than the bottom corners of the mold. One example of contouring along the long axis direction is shown in FIG. 7A, where the bottom 190 of the mold 102' curves inwardly (or the bottom 190 of the mold 102' is slightly concave) and the bottom center of the mold 102' is higher than the bottom corners of the mold 102'. The height of the bottom center of the mold 102' relative to the bottom corners of the mold 102' is indicated by h. In one embodiment, h is in a range from 50 to 150 microns. As shown in FIG. 7B, when the mold 102' is bolted to the flat surface of the plenum 104, the bottom of the mold 102' will flatten out, and the top surface of the mold will develop a contour opposite of mold warp, as shown at 192 in FIG. 7B.

Figure 8A:
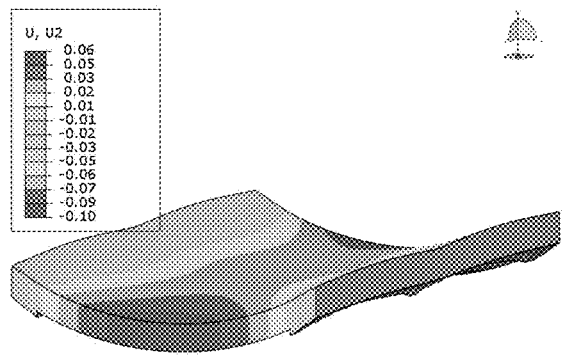
FIGS. 8A-8D are computer simulations showing the effect of mold preload on mold warp.
Figure 8B:
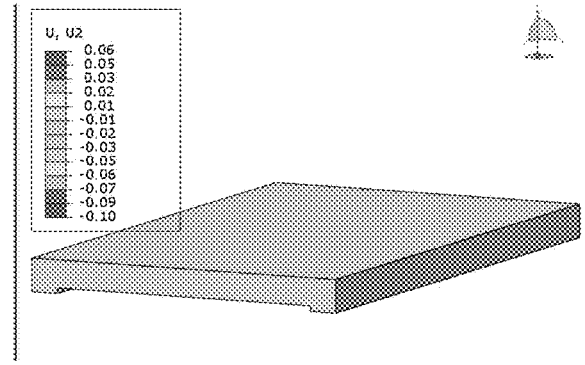
Figure 8C:
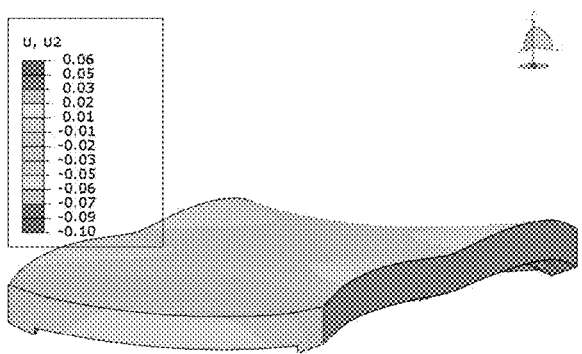
Figure 8D:
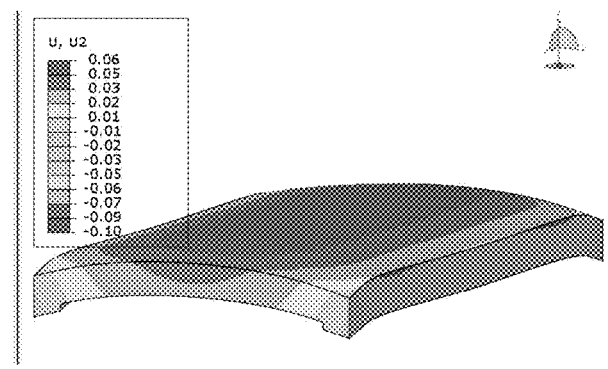

FIGS. 8A-8D show computer simulations of mold warp for 100-micron preload (that is, the mold bottom is contoured as shown in FIG. 7A with h of 100 microns) and no preload (that is, the mold bottom is not contoured) under thermal load. FIG. 8A shows a pre-cycle bolted warp, preload case. FIG. 8B shows a pre-cycle bolted warp, no preload. FIG. 8C shows post-cycle bolted warp, preload case. FIG. 8D shows post-cycle bolted warp, no preload. The mold warp is approximately 60 microns lower when the mold is preloaded.

In an experiment, the mold warp increased by 129 microns (from 27 microns to 156 microns) for a mold without preload, but by only 84 microns (from 12 microns to 96 microns) for a mold with pre-loaded, a decrease of approximately 45 microns in mold warp due to preload. The plenum and mold were identical for the two cases in other respects.

Figure 9:
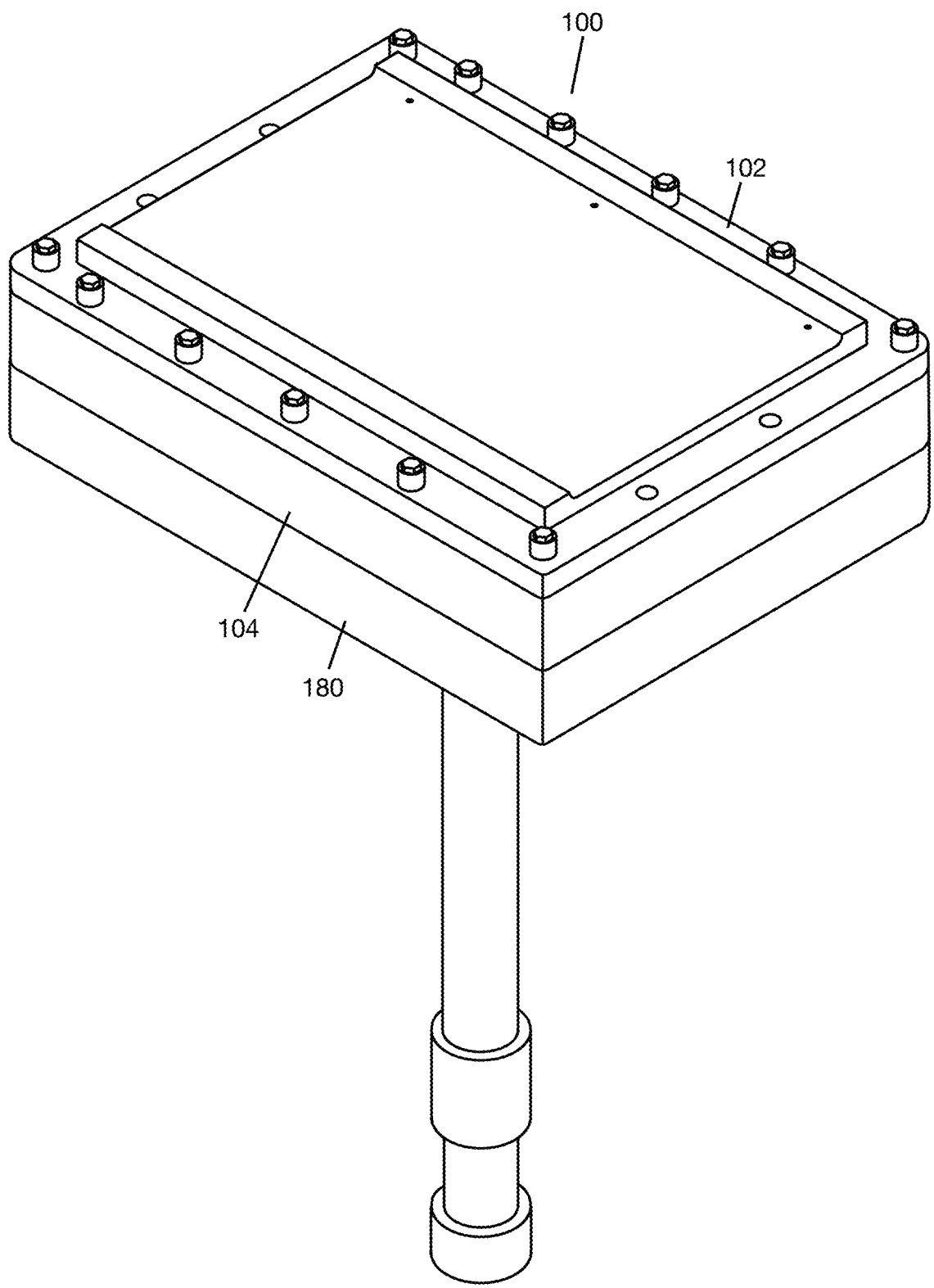
FIG. 9 shows an insulation block underneath the plenum of the mold stack of FIG. 1.

FIG. 9 shows that the mold stack 100 may further include a removable insulation block 180 underneath the plenum 104 to reduce heat loss from the bottom of the plenum 104. Lower temperature gradients from the top to the bottom of the plenum 104 will reduce the driving force for mold stack warp. Thermal gradients may be controlled by varying the thickness and in-plane size of the insulation block 180. An example of insulation material that may be used is Zircar RSLE57, although other types of insulating materials may be used. Other examples of insulation material include, but are not limited to, high strength reinforced silica matrix (99.7% $SiO_2$) composite material and high temperature alumina-silicate material, such as ALTRA® KVS series materials from Rath Incorporated. Other types of non-shedding insulating materials may be used as well. In-plane size of the insulation block 180 may be of the size of the plenum 104 or somewhat smaller (if heat loss from the edges needs to be increased). The size of the insulation block 180 may be manipulated to get the right temperature gradients in the mold 102.

Figure 10:
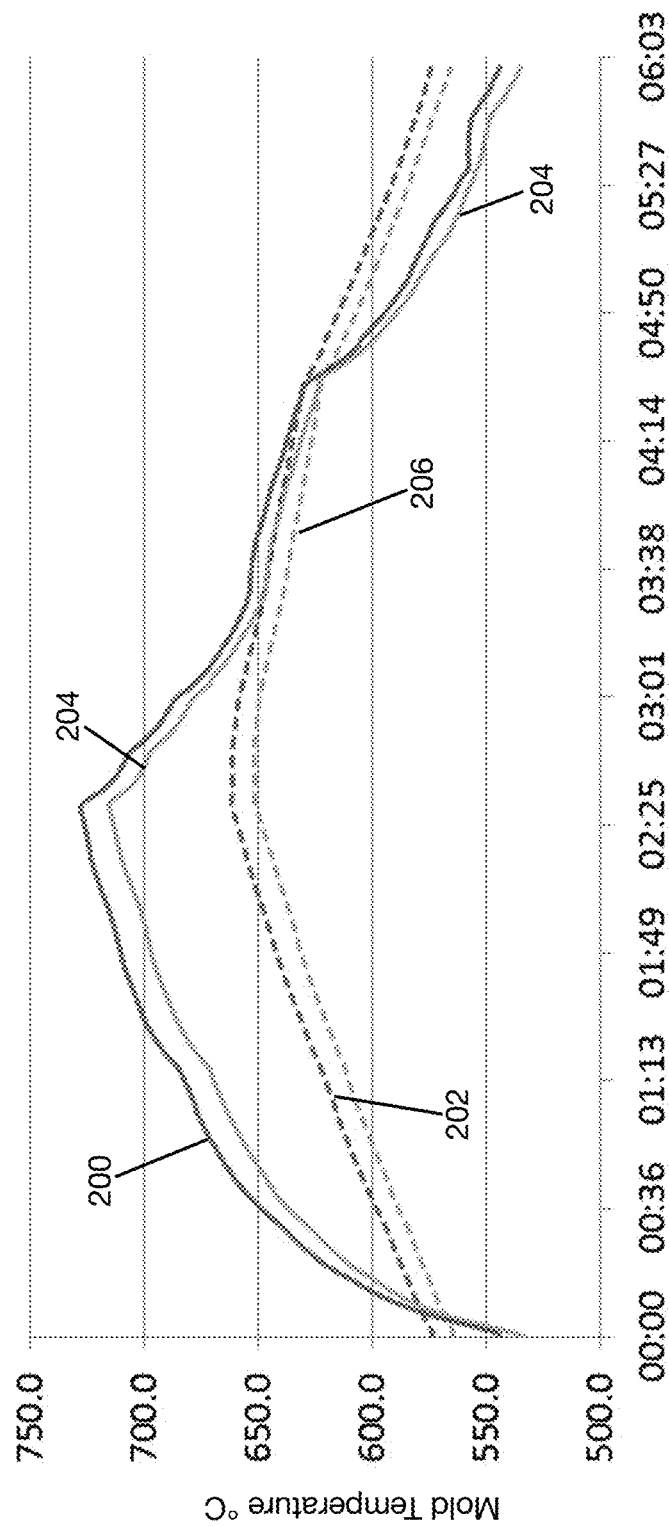
FIG. 10 shows the impact of insulation block underneath the plenum on mold temperatures.

FIG. 10 shows impact of insulation block under the plenum on mold temperatures. Lines 200, 202 show the mold temperature at a mold corner and mold center, respectively, when an insulation block is placed under the plenum. The insulation block used was Zircar RSLES. Lines 204, 206 show the mold temperature at a mold corner and mold center, respectively, when an insulation is not placed under the plenum. As shown in FIG. 10, the mold temperatures are higher with insulation block under the plenum than without insulation block under the plenum. This means that using the insulation helps in getting to target mold temperatures with lower furnace temperatures. On the other hand, if higher glass temperatures are needed with the same mold temperatures, the insulation block may be removed so that the higher furnace temperatures, which can increase the glass temperatures, are needed to get the same mold temperatures.

Figure 11:
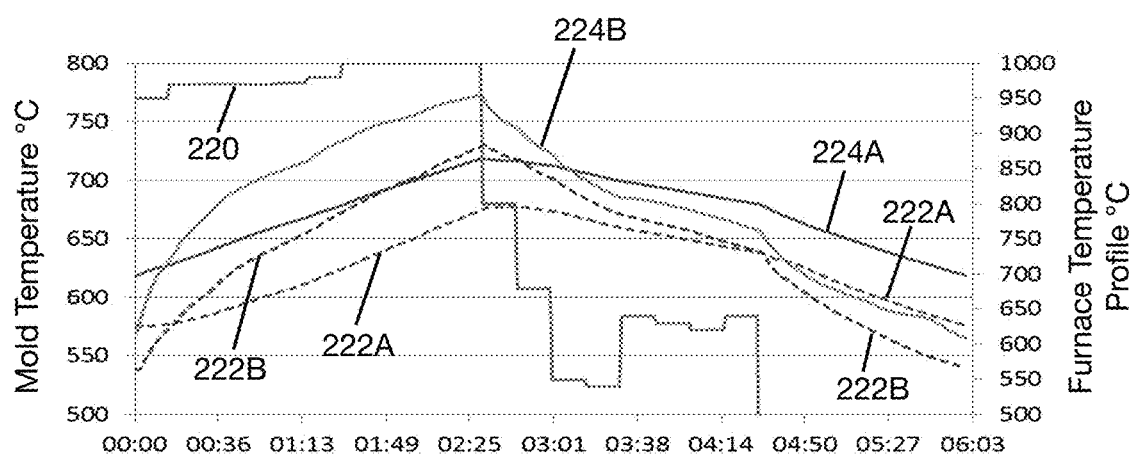
FIGS. 11 and 12 compare mold temperatures for the mold stack of FIG. 1 to the mold temperatures of a prior art mold stack.

FIG. 11 compares the mold temperatures for an embodiment of the mold stack described in this disclosure (i.e., an embodiment of the mold stack without preload but with insulation block under the plenum) to the mold stack disclosed in U.S. Pat. No. 8,783,066 (Bailey et al.). In FIG. 11, line 220 represents the emitter plate (furnace) temperature profile, line 222A represents the center mold temperature for the prior art mold stack (described in the Bailey et al. patent), and line 222B represents the corner mold temperature for the prior art mold stack. Lines 224A and 224B represent the center and corner mold temperatures, respectively, for the mold stack described in this disclosure. With similar emitter plate temperatures, the mold stack described in this disclosure is approximately 40 degrees C. hotter than the prior art mold stack.

Figure 12:
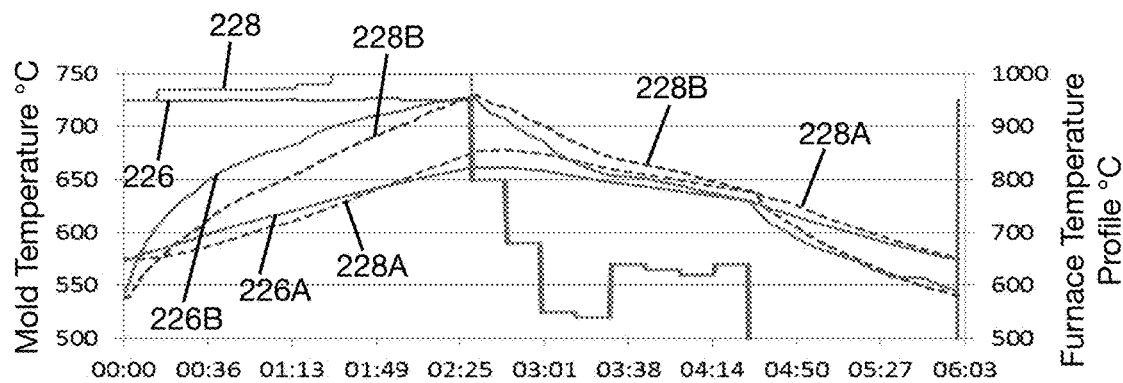

FIG. 12 shows that mold temperatures similar to the ones for the prior art mold stack (described in the Bailey et al. patent) can be obtained with 20 to 50 degrees C. lower heating zone temperatures with the mold stack described herein. In FIG. 12, line 226 represents the furnace temperature profile for the mold stack described herein, and lines 226A and 226B represent the center and corner mold temperatures, respectively, for the mold stack described herein. Line 228 represents the furnace temperature profile for the prior art mold stack, and lines 228A and 228B represent the center and corner mold temperatures, respectively, for the prior art mold stack.

While the invention has been described with respect to a limited number of embodiments, those skilled in the art of, having benefit of this disclosure, will appreciate that other embodiments can be devised which do not depart from the scope of the invention as disclosed herein. Accordingly, the scope of the invention should be limited only by the accompanying claims.

The invention claimed is:

1. A mold stack for forming 3D glass-based articles, comprising:
   a mold having a flange at a periphery thereof; and
   a vacuum plenum having a plenum base joined to a plenum enclosure wall, the mold mounted on the vacuum plenum such that the mold, the plenum base, and the plenum enclosure wall define a plenum chamber therein, and the plenum chamber comprising:
   a cooling chamber arranged between a diffuser plate, a cooling structure wall on which the diffuser plate is mounted, and the plenum base, wherein the cooling structure wall is joined to the plenum base such that a portion of the plenum base forms a cooling structure base, wherein the cooling chamber, the diffuser plate, the cooling structure wall, and the cooling structure base form a cooling structure within the vacuum plenum; and
   a process chamber arranged between the mold, the cooling structure wall, the plenum base, and the plenum enclosure wall; and
   an inlet hole and an exit hole formed in the cooling structure base, the inlet hole and exit hole being in communication with the cooling chamber; and
   wherein the flange of the mold is removably attached to a top surface of the plenum enclosure wall and the vacuum plenum is made in one piece.

2. The mold stack of claim 1, further comprising an insulation block disposed underneath the vacuum plenum.

3. The mold stack of claim 1, further comprising a tube assembly having a first fluid passage in communication with the cooling chamber and a second fluid passage in communication with the process chamber.

4. The mold stack of claim 1, wherein a portion of a bottom surface of the mold is in opposing relation with a top surface of the diffuser plate when the flange is attached to the top surface of the plenum enclosure wall.

5. The mold stack of claim 4, wherein a gap between the portion of the bottom surface of the mold that is in opposing relation with the top surface of the diffuser plate is in a range from greater than 0 microns to less than or equal to 25 microns.

6. The mold stack of claim 5, wherein the top surface of the diffuser plate is level with the top surface of the plenum enclosure wall.

7. The mold stack of claim 1, wherein a bottom surface of the mold is contoured to apply a preload to the mold.

8. The mold stack of claim 1, wherein mounting holes are formed in each of the plenum enclosure wall and the flange, and wherein a pattern of the mounting holes in the plenum enclosure wall matches a pattern of the mounting holes in the flange such that the mounting holes in the plenum enclosure wall can be aligned with the mounting holes in the flange.

9. The mold stack of claim 8, wherein the pattern of the mounting holes is selected to provide a sealed interface between the flange and the plenum enclosure wall when fasteners are received in the mounting holes and made up.

10. The mold stack of claim 8, wherein the mounting holes are adapted to receive fasteners to removably attach the flange to the plenum enclosure wall.

11. The mold stack of claim 10, wherein at least a portion of the mounting holes are adapted to receive fasteners from a top surface of the flange.

12. The mold stack of claim 10, wherein the mounting holes are adapted to receive fasteners from a bottom surface of the vacuum plenum, and wherein a top surface of the plenum enclosure wall is flat.

13. The mold stack of claim 8, wherein the mold is made of a nickel alloy and the flange is attached to the top surface of the plenum enclosure wall by means of at least one strip of bolts having a strip made of an alloy having a higher strength than the nickel alloy.

14. The mold stack of claim 1, further comprising a tube attached to the cooling structure base, the tube comprising:

at least two first orifices formed in a surface of the tube exposed to the cooling chamber, the at least two first orifices being in communication with the cooling chamber, and at least one second orifice formed in a surface of the tube in contact with the cooling structure base, the at least one second orifice being in communication with the exit hole.

15. The mold stack of claim 14, wherein the inlet hole is located at a center of the cooling structure base, and wherein the at least two first orifices are located near opposite edges of the cooling structure base.

16. The mold stack of claim 15, wherein the at least two first orifices are symmetrical about the inlet hole.

17. The mold stack of claim 1, wherein the mold has at least one vacuum hole, and wherein the at least one vacuum hole communicates with the process chamber.

18. The mold stack of claim 1, wherein the plenum enclosure wall has a uniform wall thickness, the plenum base has a uniform base thickness, a ratio of the plenum enclosure wall thickness to the plenum base thickness is in a range from 0.8 to 1.2, and a ratio of the plenum base thickness to a wall height of the plenum enclosure wall is in a range from 0.6 to 1.0.

19. The mold stack of claim 18, wherein a ratio of the plenum base thickness to a thickness of a center of the mold is in a range from 0.8 to 1.2, and wherein a ratio of the plenum enclosure wall thickness to the mold center thickness is in a range from 0.8 to 1.2.

20. The mold stack of claim 1, wherein the diffuser plate is made of a high thermal conductivity material with a minimum plate thickness of 3 mm.

21. The mold stack of claim 20, wherein the high thermal conductivity material is a nickel alloy.

* * * * *